Aug. 14, 1923.
H. M. BRITAN
TRAP
Filed Nov. 9, 1922
1,464,559
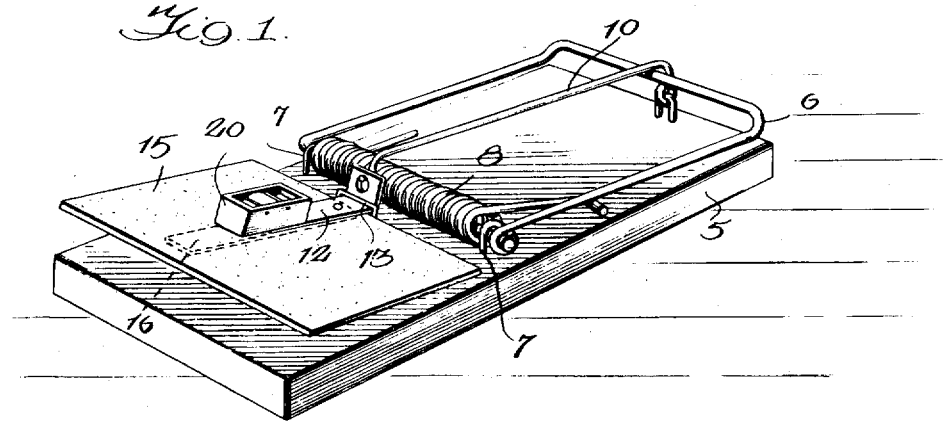
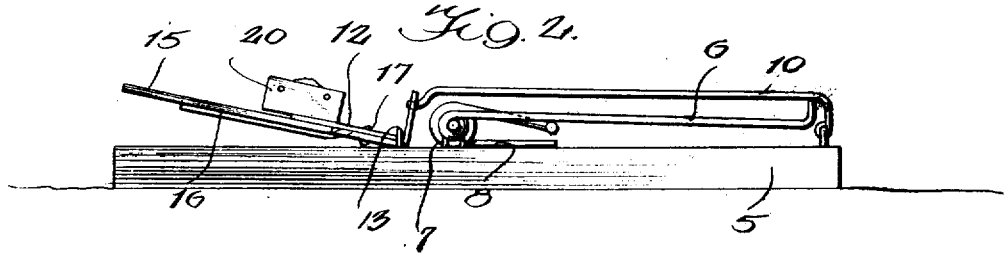
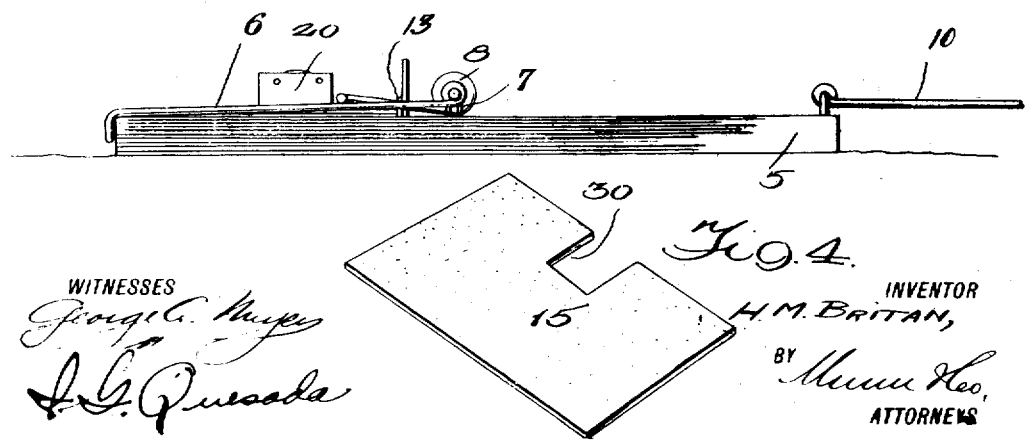
WITNESSES
INVENTOR
H. M. BRITAN,
BY
ATTORNEYS Patented Aug. 14, 1923.

1,464,559

UNITED STATES PATENT OFFICE.

HARLAN M. BRITAN, OF OJUS, FLORIDA.

TRAP.

Application filed November 9, 1922. Serial No. 599,895.

*To all whom it may concern;*

Be it known that I, HARLAN M. BRITAN, a citizen of the United States, and resident of Ojus, in the county of Dade and State of Florida, have invented certain new and useful Improvements in Traps, of which the following is a specification.

This invention relates to spring traps especially adapted for use in trapping mice, rats and the like.

When the ordinary spring trap is sprung the engagement of the spring-actuated trapping member with the head of the rodent frequently draws blood and this blood remains on the base of the trap and gives the trap an odor which causes other mice and rats to avoid the trap.

Therefore an important object of this invention is to provide a trap of the character specified wherein the trigger is provided with a wide treadle plate to receive the blood drawn as the result of the engagement of the spring-acuated striking member with the head or neck of the rodent.

The provision of the detachable treadle plate not only acts as an apron to keep the base of the trap clean but also acts as a contact member so that if the rat or mouse stands thereon the trap will be sprung.

A further object is to provide a spring trap wherein a novel form of bait carrier is provided, the said carrier being especially adapted to receive loose grains.

A further object is to provide a spring trap which is of highly simplified construction, durable in use and cheap to manufacture.

Other objects and advantages will be apparent during the course of the following description.

In the accompanying drawings forming a part of this application and in which like numerals are employed to designate like parts throughout the same, Figure 1 is a perspective of the improved trap set for operation.

Figure 2 is a side elevation of the same set for use.

Figure 3 is a side elevation of the trap after being sprung.

Figure 4 is a perspective of a combined absorbent and treadle plate embodied in the invention and which may be readily and conveniently detached when necessary.

In the drawing wherein for the purpose of illustration is shown a preferred embodiment of the invention, the numeral 5 designates an elongated base upon which the spring actuated striking element 6 is mounted through the medium of a plurality of staples 7. The usual spring 8 surrounds the pivot pin of the member 6 and when the holding arm 10 is released the spring will immediately swing the striking member to the position illustrated in Figure 3 for killing the rat or rodent in the usual manner.

The trigger designated by the numeral 12 is pivotally connected to the staple 13 and holds the forward portion of the arm 10 in a set position so as to hold the striking element 6 in retracted position. As previously stated when the animal is caught in the trap the discharged blood accumulates on the base and causes other rats to subsequently avoid the trap. To overcome this disadvantage I have provided a wide treadle plate 15 secured beneath the trigger 12 through the medium of an attaching spring 16 and it will be observed that the attaching spring 16 has its rear portion secured to the trigger as indicated at 17. The spring 16 is offset intermediate its ends to provide a socket for the reception of the treadle plate 15 and to hold the treadle plate securely in position the spring may extend for a substantial distance beyond the trigger 12. In order that the wide treadle plate 15 might collect all blood, the same may be of an absorbent material.

It will be observed that the treadle plate 15 extends to the edges of the base 5 and to one end of the base so that if a rodent steps upon the treadle plate at any point the trap will be sprung. This permits the trap to be used conveniently and advantageously between rows of boxes and other narrow places through which rats travel. In this case it is not even necessary to bait the trap.

However, if desired a quantity of bait may be carried within the bait receptacle 20 secured to the upper side of the trigger 12 and the receptacle 20 provides a means for supporting loose grain and the like in position. Of course, before a rat can get to the bait the trap is sprung.

With reference to the foregoing description taken in connection with the accompanying drawings it will be seen that the improved treadle plate 15 not only provides a means for collecting the blood and maintaining the base 5 clean but also provides a contact plate by means of which rats which travel over the same are caught. The trap as constructed does not depart radically from established practices and overcomes several of the most pronounced disadvantages.

The apron 15 may be conveniently removed and a new one substituted when necessary so that the trap is maintained free of blood.

Figure 5 illustrates that the apron is formed with a slot 30 to snugly receive the rear portion of the spring 16. This arrangement prevents the apron from accidentally turning.

Having thus described the invention, what I claim is:—

1. A trap of the class described comprising a base, a striking element mounted thereon, and a trigger for holding the striking element in a set position, said trigger being provided with a freely detachable blood collector and treadle plate extending to points adjacent the edges of the base.

2. A spring trap comprising a base, a spring actuated striking element secured to the base, a trigger for holding the striking element in a set position, and a rigid apron detachably connected to the trigger and extending to one end and to the edges of the base whereby to form a wide animal contact member and to receive the blood from the same.

3. The construction set forth in claim 2, said apron being of an absorbent material.

4. A spring trap for rodents comprising a base, a spring-actuated striking element secured to the base, a trigger pivoted to the base and having means whereby to hold the striking element in a set position, a flat retaining spring secured to the under side of the trigger and having its major portion spaced from the trigger whereby to define a socket, and a contact apron of absorbent material adapted to be arranged between said spring and said trigger whereby to collect the blood discharged from the trapped animal and to maintain the base clean, said apron being rigid and extended to the edges of the base.

5. A spring trap for rodents comprising a base, a spring-actuated striking element secured to the base, a trigger of elongated formation pivoted to the base and having means whereby to hold the striking element in a set position, a flat retaining spring secured to the under side of the trigger and having its major portion spaced from the trigger whereby to define a socket, an apron of absorbent material adapted to be arranged between said spring and said trigger whereby to collect the blood discharged from the trapped animal and to maintain the base clean, said apron being rigid and extended to the edges of the base, and a bait receptacle secured to said trigger.

6. A spring trap comprising a base, a spring actuated striking element mounted thereon, a trigger pivoted to the base for holding the striking element in a set position, a holding spring having an attaching portion flatly secured to the trigger, and a blood receiving apron confined between the trigger and the spring and having a recess to receive the attaching portion of said spring.

HARLAN M. BRITAN.